United States Patent [19]

Reiterer et al.

[11] Patent Number: 5,628,939

[45] Date of Patent: May 13, 1997

[54] PROCESS FOR PREPARING CARBON-CONTAINING REFRACTORY CERAMIC MASSES AND MOLDINGS

[75] Inventors: Franz Reiterer; Klaus Dösinger, both of Leoben, Austria

[73] Assignee: Veitsch-Radex Aktiengesellschaft für Feuerfeste Erzeugnisse, Vienna, Austria

[21] Appl. No.: 302,720

[22] PCT Filed: Mar. 6, 1993

[86] PCT No.: PCT/EP93/00511

§ 371 Date: Sep. 8, 1994

§ 102(e) Date: Sep. 8, 1994

[87] PCT Pub. No.: WO93/17979

PCT Pub. Date: Sep. 16, 1993

[30] Foreign Application Priority Data

Mar. 8, 1992 [JP] Japan .................. 42 07 249.2

[51] Int. Cl.$^6$ ................................................ C01B 31/00
[52] U.S. Cl. ................................. 264/29.1; 264/29.6
[58] Field of Search ........................ 264/29.1, 29.6

[56] References Cited

U.S. PATENT DOCUMENTS

| | | | |
|---|---|---|---|
| 4,061,501 | 12/1977 | Ivarsson et al. | 106/44 |
| 4,558,019 | 12/1985 | Kotliar et al. | 501/101 |
| 4,959,255 | 9/1990 | Suzuki | 428/143 |

Primary Examiner—Cristopher A. Fiorilla
Attorney, Agent, or Firm—John F. A. Earley; John F. A. Earley, III

[57] ABSTRACT

A process for producing fireproof, carbon-containing ceramic moldings in which an oxidic fireproof matrix material with a carbon-containing component and a polymer compound is mixed together to form a mixture, and in which the mixture is processed into moldings. The moldings subsequently are heat-treated.

23 Claims, No Drawings

PROCESS FOR PREPARING CARBON-CONTAINING REFRACTORY CERAMIC MASSES AND MOLDINGS

SPECIFICATION

The present invention pertains to a process for preparing a carbon-containing refractory ceramic molding (workpiece), as well as a carbon-containing refractory ceramic mass.

The binding of refractory materials and moldings with coal products, such as tar or pitch, has been known for a long time. A binding pitch matrix is formed during the heat treatment of the products. The secondary carbon thus formed is responsible for the strength of the product at the application temperature, but at the same time also for a favorable resistance to corrosive (metallurgical) slags, as well as for an infiltration-inhibiting action. However, the formation of the binding pitch matrix depends on the presence of aromatic compounds in the starting binder. In the case of coal tar, these are condensed polycyclic aromatic compounds, which are considered to be carcinogenic.

Therefore, there is now increasingly a change from pitch or tar to the use of synthetic resins as binders. The problem of the polycyclic aromatics is eliminated as a result. However, when phenolic resins are used (DE 32 12 671 A1), a health hazard is attributed to the monomer phenol contained in them, as well as to the decomposition products [formed] after a heat treatment. In addition, DE 37 21 642 C2 describes alicyclic hydrocarbon products of the terpene or natural resin type, and DE 39 17 965 C1 discloses various resins, especially of the epoxy type, as binders for refractory masses. Hydrocarbon and terpene resins are obtained from residues processing or from coal tar. All these binders share the common feature of having a considerable carbon residue after pyrolysis. A strength-increasing carbon skeleton is formed during coking in this case as well, but the carbon residue formed from synthetic resins is less resistant to oxidation for structural reasons than the secondary carbon formed from pitch or tar.

DE 32 12 671 C2 discloses carbon-containing refractory bricks, which contain an organic polymer, namely, a resorcinol polymer, as the binder, besides the basic refractory matrix material. Residues which are hazardous to health are also formed during the heat treatment of such bricks, but they are accepted as a compromise in exchange for the formation of a secondary carbon skeleton.

U.S. Pat. No. 4,061,501 A discloses a process for preparing a refractory lining material, in which refractory granules of < 6 mm from the group comprising magnesite, dolomite, etc., 2–15 wt. % of a binder from the group comprising bonding clay, phosphoric acid, etc., and 0.4 to 4.0 wt. % of colloidal silicic acid are mixed with a carbon-containing material, such as coke or graphite (screened to < 1 mm), and processed.

Thus, the basic task of the present invention is to provide a process for preparing a carbon-containing refractory ceramic mass and a molding, which makes possible pollutant-free preparation and use, without having to accept an appreciable loss of strength and without deterioration of the resistance to infiltration or of the resistance to corrosive slags.

The present invention is based on the discovery that this goal can also be accomplished when a non-coking polymer is used as the binder. This must be surprising, because it was assumed in the state of the art that a sufficient green strength as well as a sufficient strength after heat treatment can be achieved only if a corresponding carbon skeleton is formed by the binder.

However, carbon binding using the binder is deliberately dispensed with by the use of non-aromatic organic polymer compounds as the binder.

It was determined that a sufficient green strength can also be achieved by means of a binder whose organic components are removed without residue under the effect of temperature, and thus they are no longer available for the formation of a secondary carbon skeleton, which is considered to be indispensable according to the state of the art. At low temperatures (up to ca. 300° C.), the polymer compound acts as an "adhesive," and the other components of the mixture, namely, the refractory matrix material and the finely dispersed, elementary carbon, are quasi bonded together. It was also surprisingly found that a sufficient additional strength of the brick is guaranteed even after decomposition of the non-aromatic, preferably aliphatic polymer compound, and the finely dispersed elementary carbon will then assume the "binder function."

Consequently, the present invention pertains, in its most general embodiment, to a process for preparing a carbon-containing refractory ceramic molding, in which a refractory matrix material and finely dispersed elementary carbon are homogeneously mixed, together with a non-aromatic organic polymer compound, and the mixture is subsequently processed into moldings, and the moldings are heat-treated (tempered).

Consequently, while the polymer compound is responsible for the green strength of the brick, which is, e.g., pressed, the finely dispersed elementary carbon assumes the binder function at higher application temperatures.

Besides this finely dispersed carbon, other carbon carriers of a coarser fraction (up to 0.5 mm) may be added, but they have only metallurgical functions (increasing the resistance to infiltration and resistance to corrosive slags).

The organic polymer compound is preferably added as an aqueous solution. It can thus be easily and homogeneously mixed with the other components.

According to an advantageous embodiment, the finely dispersed elementary carbon is also dispersed in the said aqueous solution prior to addition to the preferably oxidic refractory matrix material, in order to optimize the homogeneous distribution of the carbon during the subsequent mixing.

The finely dispersed carbon component is added in the form of, e.g., carbon black, graphite or coke. The more finely this carbon component is dispersed, the more homogeneously can it be dispersed in the mixture, and the better its binder function will be after the decomposition of the polymeric binder.

The finely dispersed carbon should therefore be added as a particle fraction finer than 1 μm. Its amount relative to the total mixture is preferably 0.1 to 10.0 wt. %, and an amount of 1 to 5 wt. % is sufficient within this range, especially in the case of very finely dispersed carbon (under 0.05 μm).

However, it is also possible to premix the finely dispersed carbon with the (oxidic) refractory material, or to charge all components of the mixture separately into a mixing unit.

Non-aromatic organic polymer compounds are characterized in that their organic part decomposes without residues and without pollutant emissions at higher temperatures. "Without residue" or "without carbon residue" is defined here to mean that no secondary carbon skeleton that appreciably influences the strength of the mass or of the molding is formed under the effect of temperature.

At most, nontoxic inorganic residues remain. This is an essential feature of the present invention. According to one embodiment, the carbon residue (according to Conradson) does not exceed 0.5 wt. %.

Aliphatic compounds of the type indicated describe a generic term for organic compounds, whose C atoms are arranged in straight or branched chains, contrary to the isocyclic compounds, in which the C atoms form rings. These aliphatic organic polymers include polyalcohols, polycarboxylic acids, but also methyl, ethyl, carboxymethyl or carboxyethyl celluloses.

The polymeric binder is preferably used in an amount of 0.05 to 5.0 wt. % relative to the total mixture, and an amount of 0.1 to 0.5 wt. % is usually sufficient.

Small amounts (0.1 to 2.0 wt. % relative to the aqueous polymer solution of a dispersing component) may be added, if necessary, to the polymer compound, which is preferably used as an aqueous solution.

A great variety of materials may be used as the refractory matrix material. Basic oxidic refractory materials, such as sintered magnesia or fused magnesia, or corresponding spinels, are especially preferred, besides non-oxidic materials. The refractory matrix material is used in usual particle fractions, preferably finer than 6 mm.

Other additives, such as phosphates, e.g., sodium polyphosphates or metal powders, may optionally also be added to the mixture. While the phosphates exert an additional strength-increasing action especially in the temperature range of 200° to 1,000° C., the use of metal powders leads to the formation of stable, refractory carbides due to a reaction with the finely dispersed elementary carbon at the application temperature (e.g., in a metallurgical melting vessel). Such metal powders consist of, e.g., silicon or aluminum.

Other features of the present invention will become apparent from the other patent claims as well as the other application documents.

The present invention will be explained in greater detail below on the basis of an exemplary embodiment:

A sintered magnesia of a particle fraction finer than 6 mm is used as the refractory oxidic matrix material to prepare carbon-containing magnesia bricks.

Carbon black is used as the finely dispersed carbon, with a particle size of less than 1 µm. The carbon black is dispersed in an aqueous solution, which also contains 6 wt. % of polyacrylate as an aliphatic organic polymer compound and 54 wt. % of water, besides 40 wt. % of carbon black.

Ninety parts by weights of sintered magnesia are subsequently mixed homogeneously with 5 parts by weight of flake graphite and 5 parts by weight of the aqueous solution (corresponding to 0.3 wt. % of polyacrylate relative to the total mixture). The mixture is pressed into bricks after homogenization, and heat-treated at ca. 250° C.

Until the heat treatment, the polyacrylate assumes a binder function and ensures the green strength of the bricks. The polyacrylate burns out at least partially during the heat treatment, and the further strength of the brick is ensured predominantly by the finely dispersed carbon black particles.

Any polymeric binder that may still be present also decomposes at higher (application) temperatures, doing so without the formation of secondary carbon.

The bricks thus prepared are free from pollutants and possess favorable properties during application, which are comparable to those of tar- or pitch-bound or resin-bound bricks.

We claim:

1. Process for preparing carbon-containing refractory ceramic masses, in which a refractory ceramic matrix material is mixed homogeneously with elementary carbon, together with a non-aromatic polymer compound with a carbon residue (according to Conradson) of less than 0.5 wt. %.

2. Process for preparing carbon-containing refractory ceramic moldings, in which a refractory ceramic matrix material and elementary carbon in a particle fraction of less than 1 µm are homogeneously mixed with a non-aromatic organic polymer compound with a carbon residue (according to Conradson) of less than 0.5 wt. %, the mixture is subsequently processed into moldings, and the moldings are subsequently heat-treated.

3. Process in accordance with claim 2, in which the non-aromatic organic polymer compound is an aliphatic polymer compound.

4. Process in accordance with claim 2, in which the non-aromatic organic polymer compound is an aqueous solution.

5. Process in accordance with claim 4, in which a dispersing agent is added to the polymer solution in an amount of 0.1 to 2.0 wt. % relative to the weight of the polymer solution.

6. Process in accordance with claim 2, in which the non-aromatic organic polymer compound is a non-aqueous solution.

7. Process in accordance with claim 2, in which the elementary carbon is carbon black, graphite or coke.

8. Process in accordance with claim 2, in which the finely dispersed elementary carbon is added in an amount of 0.1 to 10.0 wt. % relative to the total weight of the mixture.

9. Process in accordance with claim 8, in which the finely dispersed elementary carbon is added in an amount of 1.0 to 5.0 wt. % relative to the total weight of the mixture.

10. Process in accordance with claim 1, in which another carbon-containing component is added as a coarser particle fraction to the mixture besides the finely dispersed elementary carbon.

11. Process in accordance with claim 10, in which the total carbon content is 30.0 wt. % relative to the total weight of the mixture of the refractory matrix mixture, the non-aromatic organic polymer and the carbon.

12. Process in accordance with claim 2, in which the non-aromatic organic polymer compound and the finely dispersed elementary carbon are in the form of a premixed dispersion.

13. Process in accordance with claim 2, in which the refractory matrix material is a refractory oxide.

14. Process in accordance with one of the claim 1, using sintered magnesia, fused magnesia or magnesia-aluminate spinel as the refractory matrix material.

15. Process in accordance with claim 2, in which the refractory matrix material has a particle size of less than 6 mm.

16. Process in accordance with claim 2, in which the non-aromatic organic polymer compound are polyacrylates, polycarboxylic acids, polyvinyls, polyvinylic acids, polyalcohols, methyl, ethyl, and/or carboxyethyl celluloses.

17. Process in accordance with claim 2, in which the amount of the non-aromatic organic polymer compound is 0.05 to 5.0 wt. % relative to the weight of the total mixture.

18. Process in accordance with claim 17, in which the amount of the non-aromatic organic polymer compound is 0.1 to 0.5 wt. % relative to the weight of the total mixture.

19. Process in accordance with claim 2, in which the heat treatment is carried out in a temperature range of 130° C. to 300° C.

20. Process for enhancing a refractory ceramic mass to obtain a mass that is pollutant-free when heat treated, comprising the steps of mixing a refractory ceramic matrix material with elementary carbon in a particle fraction of less than 1 μm to form a carbon-containing refractory ceramic mass, and mixing into the mass a non-aromatic organic polymer compound with a carbon residue (according to Conradson) of less than 0.5 wt. % to obtain an enhanced mass, the enhanced mass consisting essentially of the refractory ceramic matrix material, the elementary carbon, and the non-aromatic organic polymer compound, and the enhanced mass being pollutant-free when heat treated.

21. The process of claim 20, in which the non-aromatic organic polymer compound is an aliphatic polymer compound, in which the elementary carbon is carbon black, graphite or coke, in which the elementary carbon is in an amount of 1.0 to 5.0 wt. % relative to the total weight of the enhanced mass, the enhanced mass further including a second carbon-containing component which is added as a coarser particle fraction to the enhanced mass, the polymer compound being an aqueous polymer solution, the enhanced mass further including a dispersing agent which is added to the polymer solution in an amount of 0.1 to 2.0 wt. % relative to the weight of the polymer solution, in which the total carbon content is 30.0 wt. % relative to the total weight of the enhanced mass, in which the refractory matrix material is sintered magnesia, fused magnesia or magnesia-aluminate spinel, in which the refractory matrix material has a particle fraction of less than 6 mm, in which the non-aromatic organic polymer compound are polyacrylates, polycarboxylic acids, polyvinyls, polyvinylic acids, polyalcohols, methyl, ethyl, carboxyethyl celluloses, or mixtures thereof, and in which the non-aromatic organic polymer compound is in an amount of 0.1 to 0.5 wt. % relative to the weight of the enhanced mass.

22. Process of enhancing a refractory ceramic molding to obtain a molding that is pollutant-free during preparation, comprising the steps of mixing a refractory ceramic matrix material with elementary carbon in a particle size of less than 1 μm to form a carbon-containing refractory ceramic mass, and mixing into the mass a non-aromatic organic polymer compound with a carbon residue (according to Conradson) of less than 0.5 wt. % to obtain an enhanced mass, processing the enhanced mass into a molding, and heat treating the molding, the enhanced mass consisting essentially of the refractory ceramic matrix, the elementary carbon, and the non-aromatic organic polymer compound, and the enhanced mass being pollutant-free when heat treated.

23. The process of claim 22, in which the non-aromatic organic polymer compound is an aliphatic polymer compound, in which the elementary carbon is carbon black, graphite or coke, in which the elementary carbon is in an amount of 1.0 to 5.0 wt. % relative to the total weight of the enhanced mass, the enhanced mass further including a second carbon-containing component which is added as a coarser particle size to the enhanced mass, the polymer compound being an aqueous polymer solution, the enhanced mass further including a dispersing agent which is added to the polymer solution in an amount of 0.1 to 2.0 wt. % relative to the weight of the polymer solution, in which the total carbon content is 30.0 wt. % relative to the total weight of the enhanced mass, in which the refractory matrix material is sintered magnesia, fused magnesia or magnesia-aluminate spinel, in which the refractory matrix material has a particle size of less than 6 mm, in which the non-aromatic organic polymer compound are polyacrylates, polycarboxylic acids, polyvinyls, polyvinylic acids, polyalcohols, methyl, ethyl, carboxyethyl celluloses, or mixtures thereof, and in which the non-aromatic organic polymer compound is in an amount of 0.1 to 0.5 wt. % relative to the weight of the enhanced mass, in which the heat treating is carried out in a temperature range of 130° C. to 300° C.

\* \* \* \* \*

UNITED STATES PATENT AND TRADEMARK OFFICE
CERTIFICATE OF CORRECTION

PATENT NO. : 5,628,939

DATED : May 13, 1997

INVENTOR(S) : Franz Reiterer and Klaus Dosinger

It is certified that error appears in the above-identified patent and that said Letters Patent is hereby corrected as shown below:

Title page, in the Foreign Application Priority Data section, change "[JP] Japan" to --[DE] Germany--.

Signed and Sealed this

Fifth Day of August, 1997

*Attest:*

BRUCE LEHMAN

*Attesting Officer*  *Commissioner of Patents and Trademarks*